CUMMULATIVE DIGITAL COMPUTING SYSTEMS

Filed April 9, 1962

8 Sheets-Sheet 1

INVENTORS.
PAUL R. ADAMS
JOSEPH A. FINGERETT
BY ROBERT VON BUELOW
Robert Lieber
ATTORNEY Aug. 31, 1965 P. R. ADAMS ET AL 3,204,088

CUMMULATIVE DIGITAL COMPUTING SYSTEMS

Filed April 9, 1962 8 Sheets-Sheet 2

INVENTORS.
PAUL R. ADAMS
JOSEPH A. FINGERETT
BY ROBERT VON BUELOW

ATTORNEY

CUMMULATIVE DIGITAL COMPUTING SYSTEMS

Filed April 9, 1962

INVENTORS.
PAUL R. ADAMS
JOSEPH A. FINGERETT
BY ROBERT VON BUELOW

Robert Lieber
ATTORNEY

INVENTORS.
PAUL R. ADAMS
JOSEPH A. FINGERETT
BY ROBERT VON BUELOW
Robert Lieber
ATTORNEY

INVENTORS.
PAUL R. ADAMS
JOSEPH A. FINGERETT
BY ROBERT VON BUELOW
ATTORNEY

CUMMULATIVE DIGITAL COMPUTING SYSTEMS

Filed April 9, 1962 8 Sheets-Sheet 6

INVENTORS.
PAUL R. ADAMS
JOSEPH A. FINGERETT
BY ROBERT VON BUELOW
Robert [signature]
ATTORNEY

CUMMULATIVE DIGITAL COMPUTING SYSTEMS

Filed April 9, 1962 8 Sheets-Sneet 7

INVENTORS.
PAUL R. ADAMS
JOSEPH A. FINGERETT
BY ROBERT VON BUELOW
ATTORNEY

CUMMULATIVE DIGITAL COMPUTING SYSTEMS

Filed April 9, 1962 8 Sheets-Sheet 8

INVENTORS.
PAUL R. ADAMS
JOSEPH A. FINGERETT
BY ROBERT VON BUELOW
Robert Lisa
ATTORNEY 3,204,088

CUMULATIVE DIGITAL COMPUTING SYSTEMS

Paul R. Adams, Upper Montclair, N.J., and Joseph A. Fingerett, Pacoima, and Robert von Buelow, Encino, Calif., assignors to International Telephone and Telegraph Corporation, Nutley, N.J., a corporation of Maryland Filed Apr. 9, 1962, Ser. No. 185,886
12 Claims. (Cl. 235—152)

This invention relates generally to cumulative digital computing systems, and particularly to numerical integration systems, which employ signals representative of extrapolated (predicted) values of successive incremental variations in a variable.

There are a number of digital computing situations wherein signals representing a sequence of successive incremental changes in a computation variable are required to extend discontinuously over a range of values including both positive and negative numbers. In such situations, if it is required to estimate or predict the values of the increments by extrapolating on the basis of previously observed values, then upon each reversal in sign of the actual observed values of the increments, an error, hereinafter termed sign reversal error, will have accrued in the computation based on the extrapolated values. If the computation is cumulative, then, under given sequences of variation of the observed increment values, and in given computing arrangements, the sign reversal error is also cumulative. In fact, in one such computation for performing numerical integration, a cumulative sign reversal error which rapidly assumes intolerable proportions has been noted. In this particular computation, the values of the incremental changes are permitted to rapidly oscillate in discrete steps between positive and negative values.

It is emphasized that the foregoing "run away" condition of cumulative error buildup does not occur in all computing situations and is normally not noticeable until after a considerable number of oscillations of the extrapolated increment values have occurred. In fact, where such intolerable sign reversal errors have previously been observed, they have been attributed to failures in the computing mechanism while deficiences in computing technique have been discounted. It is however, our discovery that the foregoing cumulative sign reversal errors are due to a shortcoming in computing technique which can be remedied by circuits which automatically insert correction factors to null, or cancel, the incremental sign reversal errors as soon as they are detected.

It is therefore an object of this invention to reduce cumulative sign reversal errors arising in cumulative digital computations which employ signals representative of extrapolated values of successive incremental changes in a variable.

Still another object is to provide a concurrent digital integrator system of improved design.

Another object is to reduce cumulative sign reversal errors arising in digital integration systems employing signals which represent extrapolated values of successive incremental variations in an integration variable.

In accordance with these objects, a feature of the inveniton resides in the provision, in a digital integrator, of means for detecting reversals in the sign of the values represented by signals corresponding to successive extrapolated increments in an integration variable. Further, means are coupled to the output of the sign reversal detecting means, and operative upon each said reveral, to introduce appropriate correction factors into a cumulative numerical integral, which is dependent upon the aforementioned extrapolated increments, to thereby cancel sign reversal errors in the integral as they arise.

These and other objects and features of the invention will be more readily appreciated upon consideration of the following specification and claims, including the accompanying drawings wherein:

FIG. 1 is a drawing of a general symbolic representation of a digital integrator;

FIG. 1*a* is a block diagram of a circuit operative to provide the digital integration function symbolized in FIG. 1;

FIG. 2 is a graph illustrating the time relationship between associated integration variables, $u$ and $v$, which is useful in defining the problem for which the present invention provides a solution;

FIG. 3 is a block diagram of an integrator circuit similar to that shown in FIG. 1*a*, but modified in accordance with the present invention to include means for detecting reversals in the sign of the values associated with signals which represent extrapolated increments in the relatively independent variable $v$, and means for modifying the resultant cumulative computation upon the occurrence of each such detected sign reversal;

Figure 1:
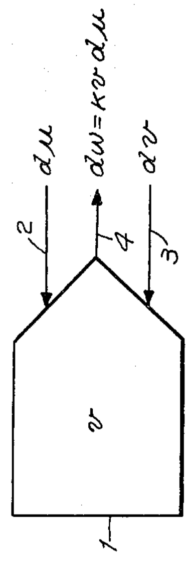
Figure 1A:
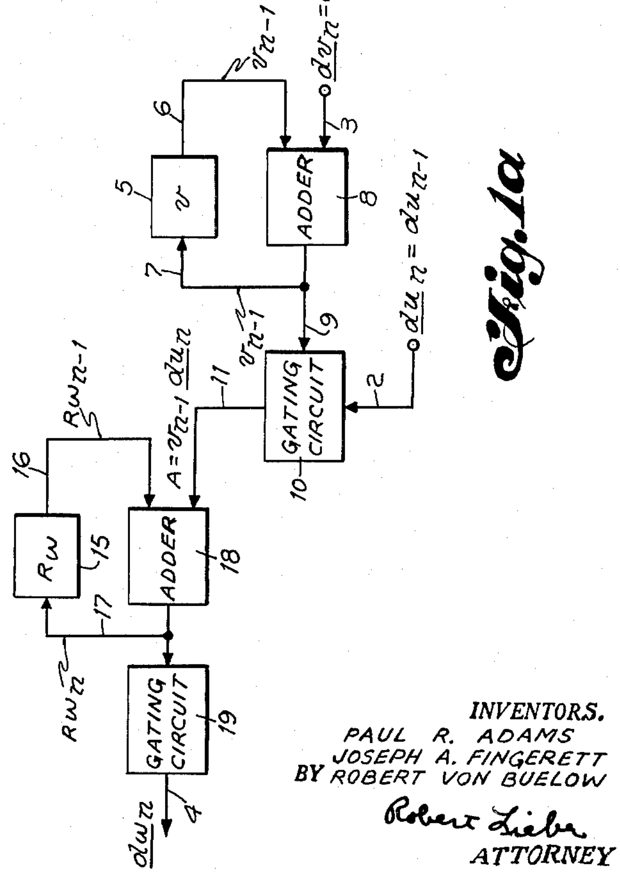
Figure 3:
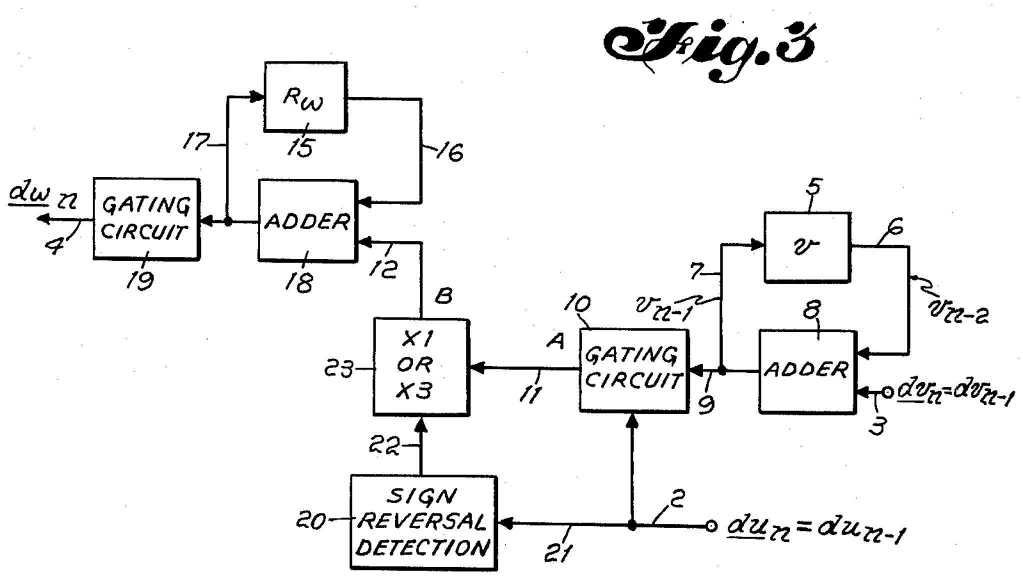
Figure 4:
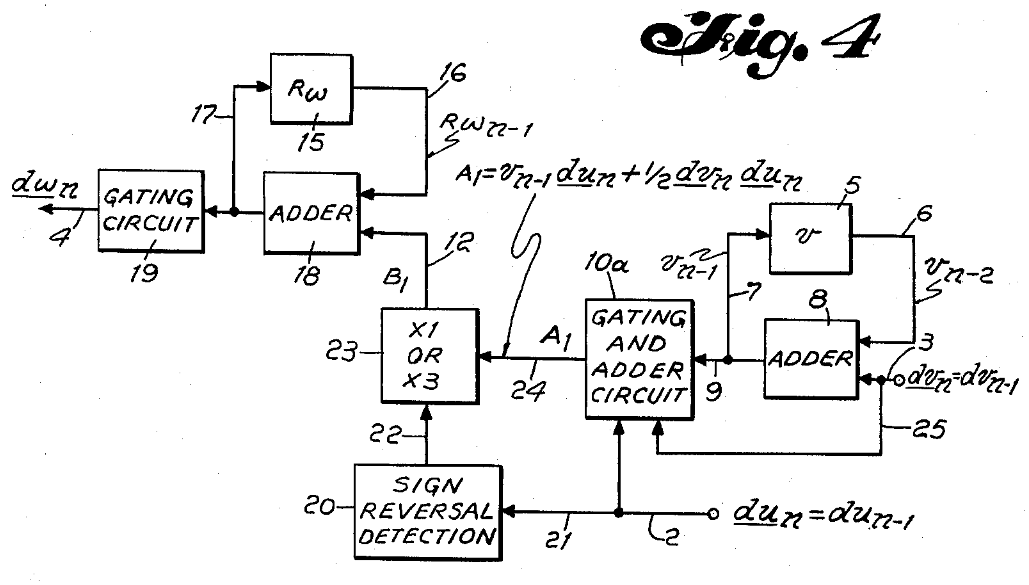
FIG. 4 is a block diagram illustrating a preferred circuit arrangement which provides an approximate sign reversal correction in accordance with the present invention.
Figures 5, 6A:
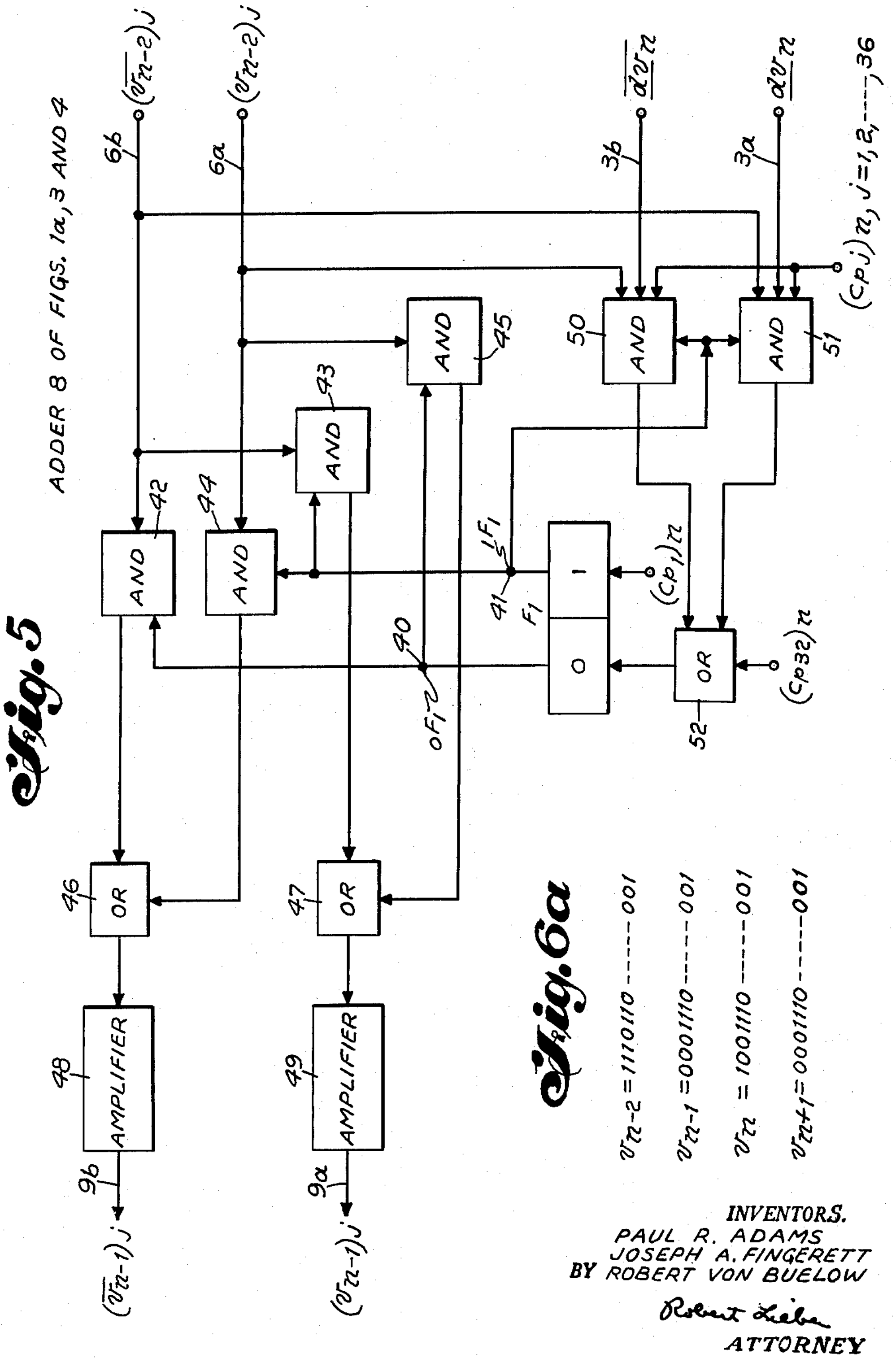
FIG. 5 is a schematic circuit diagram illustrating details of adder 8, which is illustrated as a block in FIGS. 1*a*, 3, and 4.
Figure 6:
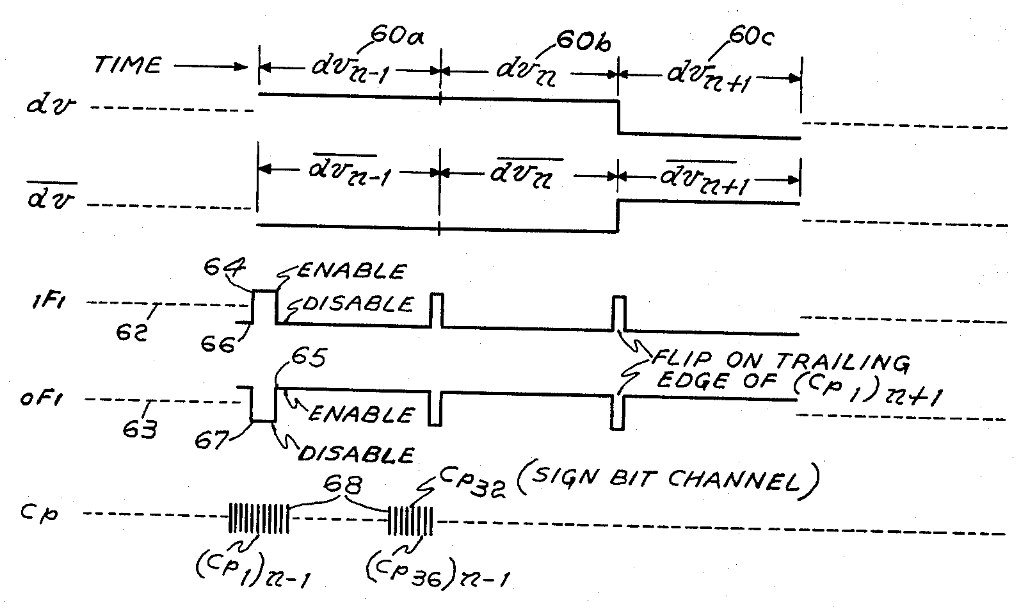
FIG. 6 is a timing diagram useful in explaining the operation of the circuit shown in FIG. 5, and also useful in explaining the operation of the circuits in FIGS. 7–10.
Figure 7:
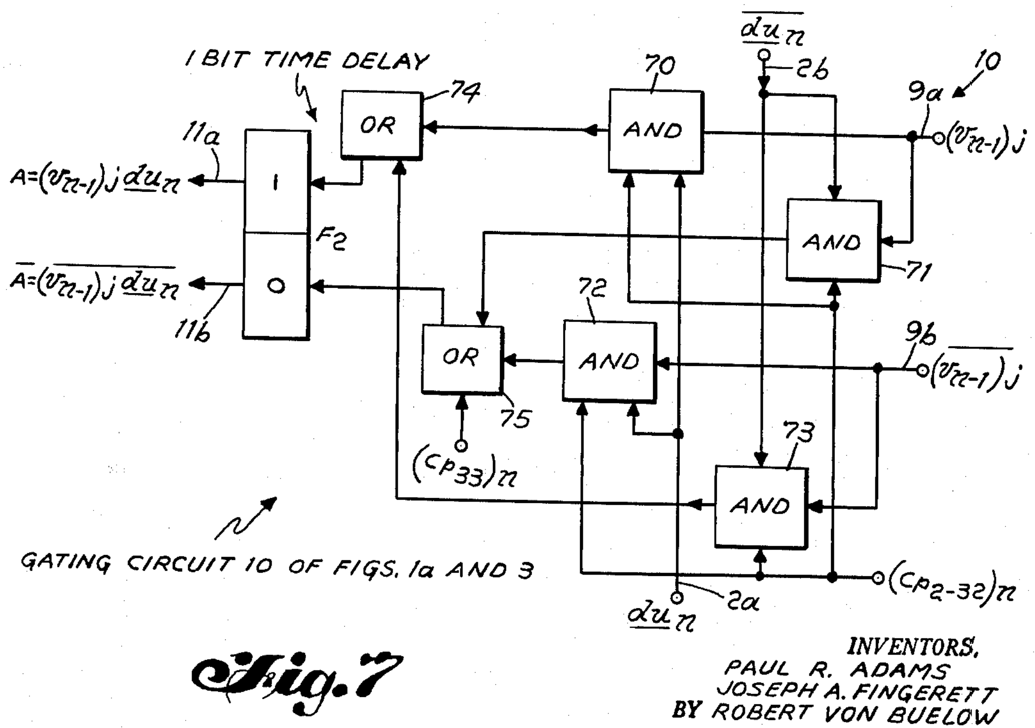
Figure 8:
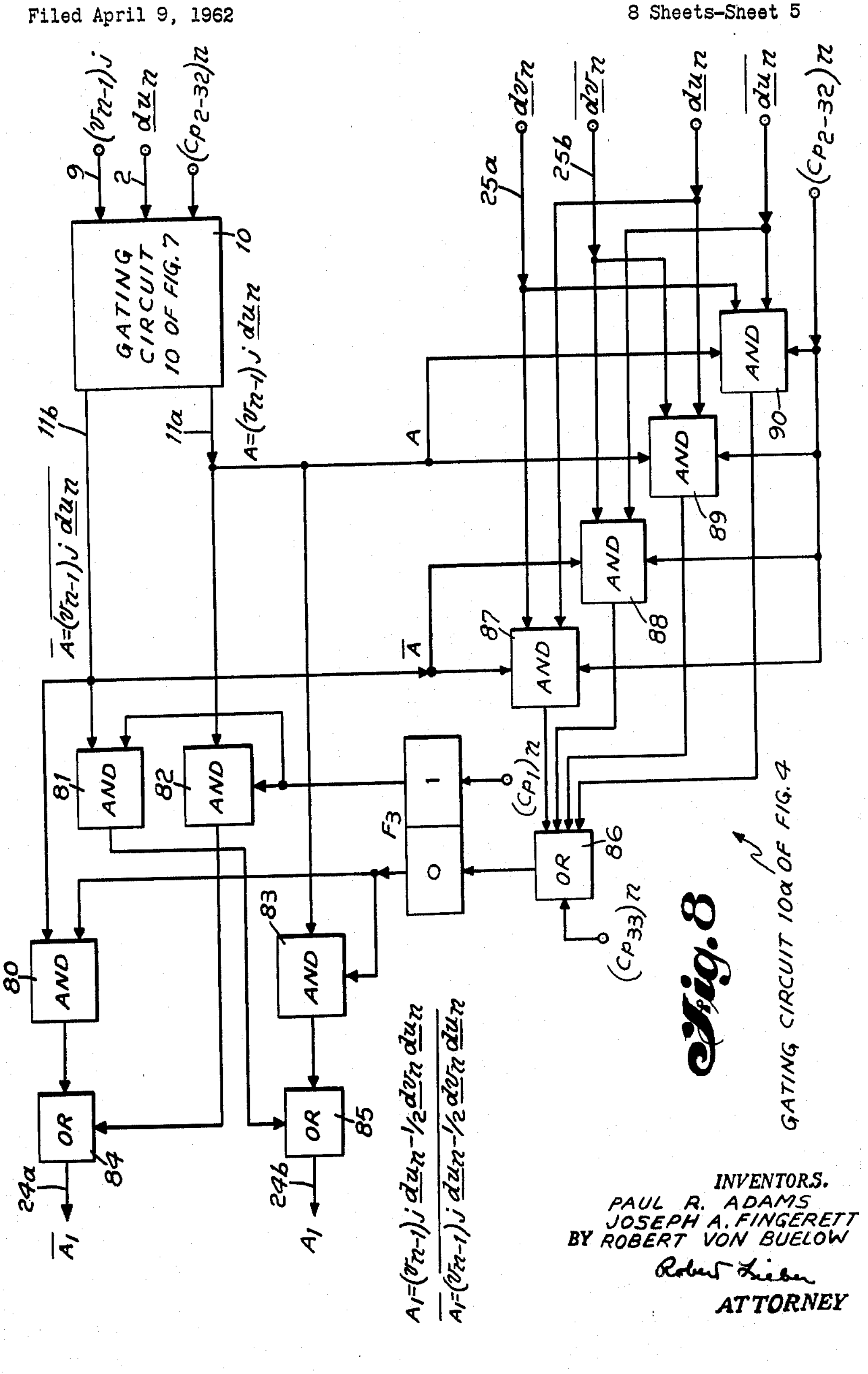
Figure 9:
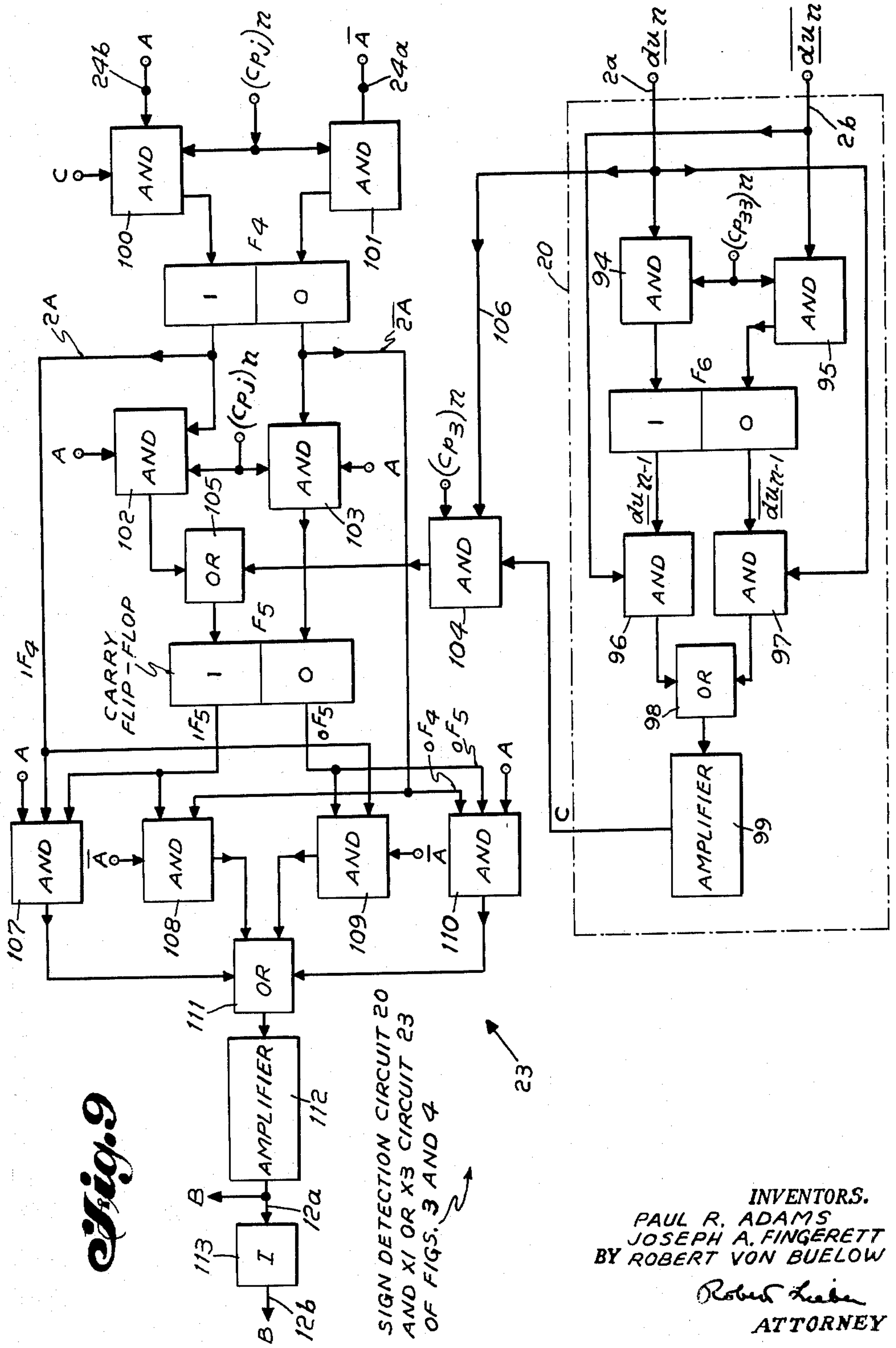
Figure 10:
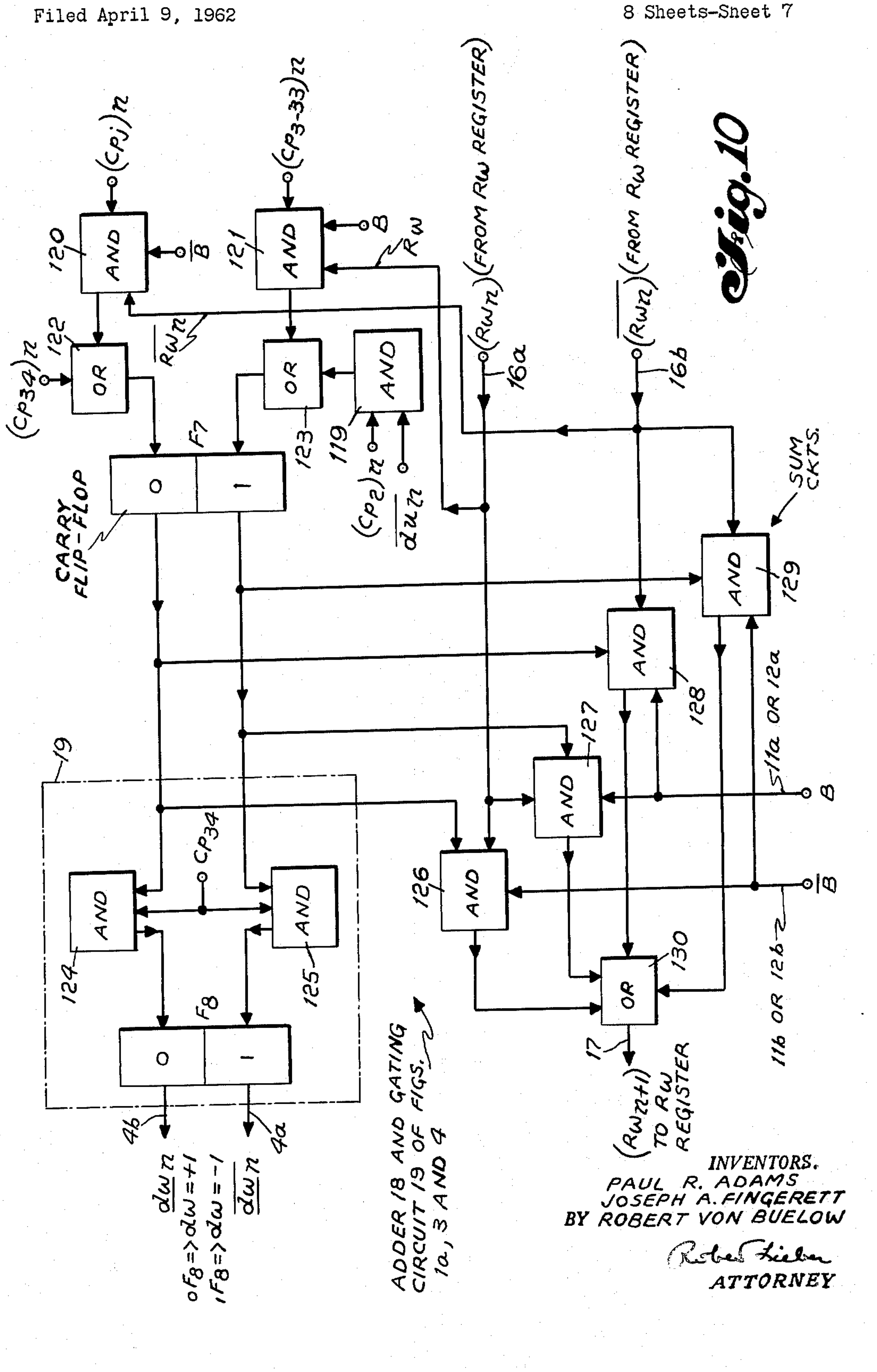
Figure 11:
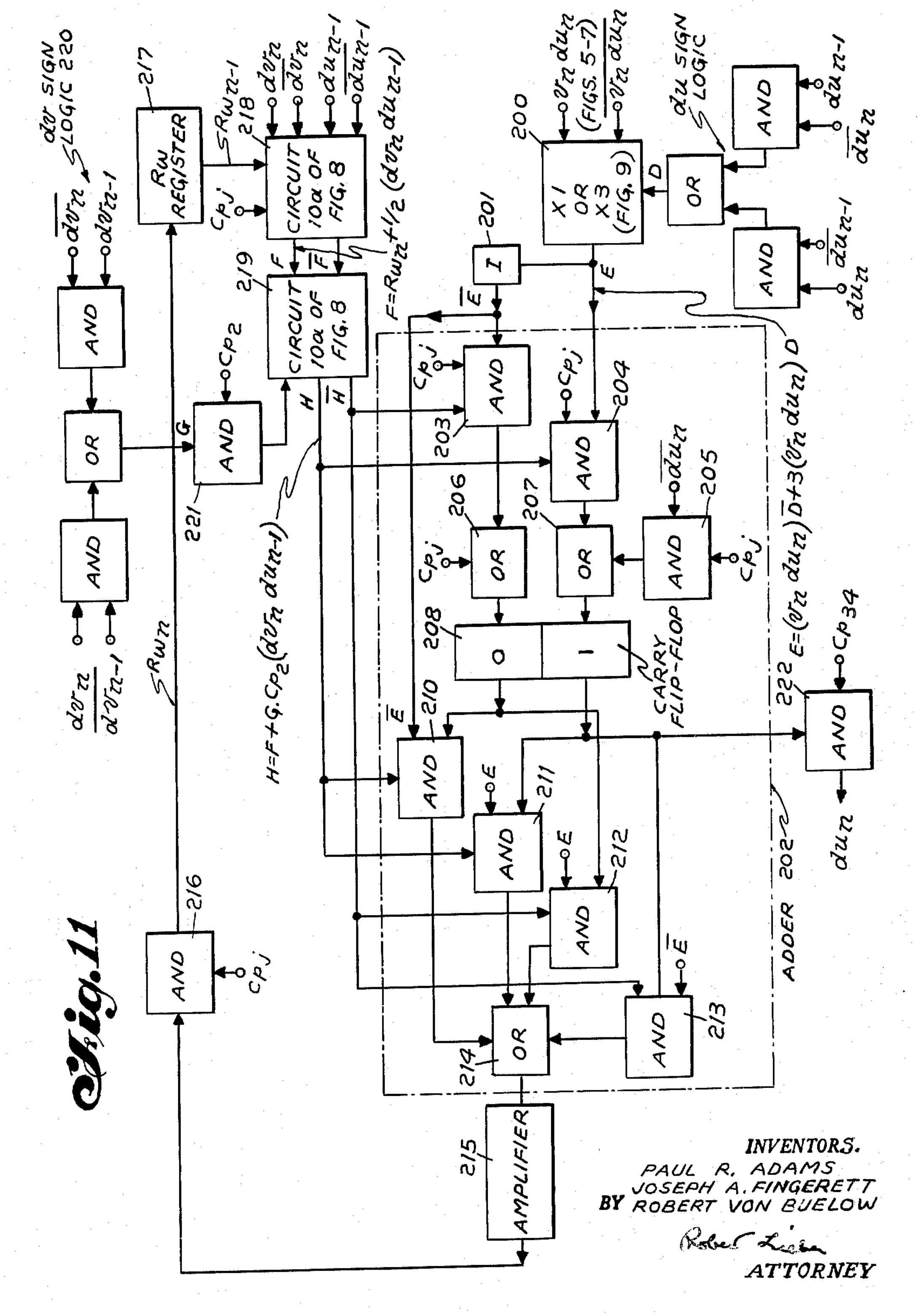

FIG. 6*a* comprises a sequence of numerical values assumed by the accumulated variable $v$ of FIG. 5, in accordance with the timed signal sequence illustrated in FIG. 6;

FIG. 7 is a schematic circuit diagram illustrating details of gating circuit 10 which in shown as a block in FIGS. 1*a* and 3;

FIG. 8 is a schematic circuit diagram illustrating details of gating circuit **10*a*** which is shown as a block in FIG. 4;

FIG. 9 is a schematic circuit diagram illustrating details of the sign reversal detection, and selective modification, circuits shown respectively as blocks 20, and 23, in FIGS. 3 and 4;

FIG. 10 is a schematic circuit diagram illustrating details of adder circuit 18 and gate circuit 19, which are shown as blocks in FIG. 1*a*, 3, and 4; and FIG. 11 is a block diagram illustrating an arrangement for carrying out the complete correction procedure for correcting signl reversal errors in accordance with the present invention.

Although applicable to cumulative digital computing systems in general, in order to maintain precision and clariy of explanation, the invention is disclosed in connection with a digital integration system and circuits employed therein, the extension of the invention to the general situation being obvious upon consideration of the specific disclosure.

Digital integration systems, otherwise known as iterative computers, digital differential analyzers, or numerical integration systems, solve differential equations by means of basic units known as digital or numerical integrators. Each integrator performs cumulative algebraic operations on two input signal trains which represent sequences of successive incremental variations in a pair of interrelated integration variables. The output result of such cumulative algebraic operations is a signal train which represents successive increments in the definite integral of one of the input variables taken with respect to the other input variable.

This situation is symbolically characterized in FIG. 1 wherein the pentagonal shaped block 1 represents the symbol for a digital integration unit receiving input signals on input leads 2 and 3, representative of successive incremental variations, $du$ and $dv$, in respective input variables $u$ and $v$ having a determinable relationship. The output 4 of unit 1 is a signal train representative of successive increments $dw$, in an output variable $w$, which may, for example, serve as an incremental input to another integration unit.

Referring to FIG. 1*a*, a unit such as that characterized by the symbol 1, in FIG. 1, generally comprises two registers, such as the registers 5 and 15. The register 5 is used to accumulate successive values of one of the input variables $v$, derived from the summation in adder 8 of successive increments $dv$, in that variable. In the particular illustration, the input variable $v$ is accumulated in discrete steps in register 5 by periodically circulating each value of $v$ out of the register and into the adder 8—where the next successive value, $dv$, is added to the previous value of $v$—and thereafter returning the new value of $v$ to the register 5 through connection 7. The succession of values of the variable $v$ and the increments $dv$ is characterized by the subscript $n$, which therefore also identifies the computing time interval during which each value of $v$ is accumulated.

The output of the adder 8 is applied to a gating circuit 10 which receives signals representative of successive increments $du$, in the input variable $u$, which represents the independent variable of integration. The function of gating circuit 10 is to operate upon the signals which represent successive increments $du_n$ in the variable $u$, and successive values $v_{n-1}$ of the variable $v$ so as to provide output signals representative of the products $v_{n-1}d_{un}$. It should readily be appreciated that the sum of these products provides an approximation to the definite integral $w$ of the variable $v$ taken with respect to the variable $u$, the coarseness of the approximation being dependent upon the relative magnitudes of the incremental variations $du$ and $dv$.

In order to simplify the computing process in general and the multiplying operation provided by circuit 10, in particular, it is desirable to restrict the values of the increments $du$, $dv$, and $dw$ to two possible values which respectively represent incremental variations of +1 and −1 units in the corresponding variable. To accomplish this, the increments $du$, $dv$, and $dw$ are manifested in what are commonly termed difunction signal trains. Such trains comprise signals which are instantaneously at one of two fixed amplitudes arbitrarily designated +1 or −1 units, in terms of numerical value. Each such train varies discontinuously between the two fixed amplitudes in such fashion that the average amplitude of the signal in time is any amplitude between the instantaneous fixed amplitudes, and therefore any value between +1 and −1 units. Thus, in the illustration of FIG. 1*a* each of the increment signals $du_n$, $dv_n$, and $dw_n$, during the $n^{th}$ computing cycle assumes a value corresponding to an incremental variation of +1 or −1 units in the corresponding variable over the $n^{th}$ time interval, each such time interval hereinafter being designated as a word time interval.

During each word time interval, the value held in each register of FIG. 1*a* is completely cycled through the corresponding adder unit and augmented by either +1 or −1 units. However, the total number of word times over which the +1 and −1 increment values persist determines the actual of the variables. For example, if in successive word time intervals, the value of an increment alternates equally between +1 and −1, the average rate of variation, and therefore the average value, is taken to be 0. Similarly, if the value +1 persists for a greater time than the value −1, the value of the average rate of variation of the increment lies between 0 and +1 units, while if the value −1 predominates in time, the average rate of variation assumes a value between 0 and −1. It is thus clear that the multiplying function of the circuit 10 in FIG. 1*a* merely involves the passage of the signal intelligence at the output of adder 8 either unmodified, or with the digit signals complemented (multiplied by −1) depending upon whether $du_n$ is +1 or −1. Thus, the function of circuit 10 is accomplished through appropriate selection, and the circuit is therefore designated a gating circuit.

The output of gating circuit 10, designated A, is applied to an adder circuit 18 which accumulates the successive values of A in the register 15, in a manner similar to that involved in the accumulation of the values of $v$. The successively accumulated values are designated $Rw_n$, and each overflow carry from the highest order digit of $Rw_n$, during each word time transfer through the adder 18, is selectively stored in and forwarded through gate circuit 19 during the next word time interval as a +1 or −1 increment $\underline{dw_n}$ in the variable $w$. It should thus be appreciated that to a very close approximation $$\frac{dw}{dt}=kv\frac{du}{dt}$$

where the constant $k$ is determined by the number of significant digits of the number $Rw$ stored in the register 15, and $$\frac{du}{dt}$$

and $$\frac{dw}{dt}$$

represent respectively the average rates of variation of $u$ and $w$. It should also be appreciated that to a very close approximation $$\frac{du}{dt}$$

and $$\frac{dw}{dt}$$

respectively represent instantaneous values of the ordinary time derivatives of $u$ and $w$, if $du$ and $dw$ are measured in small enough time increments.

The problem considered herein in connection with digital integrators, and in general with all similar computing devices, relates to the relative frequency of sign reversal of the successive increments of the computation variables, and cumulative errors that result therefrom. The causes of such errors are considered in connection with FIG. 2 wherein a graph 30 of the variable $v$, measured along the axis 33, is shown in relation to the variable $u$, measured along the axis 32. A time reference is provided by means of the axis 31 below the axis 32. At time $t_n$, the variables $u$ and $v$ are assigned the respective values $u_n$ and $v_n$. The interval between successive times such as $t_{n-1}$ and $t_n$, is a basic word time interval identified by the number $n$, during which the $n^{th}$ complete cycle of computation is provided. If at time $t_{n-1}$ the increments $du$ and $dv$ are positive, as shown, the increments $dRw$ in the integral $w$ correspond approximately to the areas of rectangular segments extending to the right of the instantaneous locus of $u$, $v$, as in the rectangle ABCD extending to the right of the point $u_{n-1}$, $v_{n-1}$. On the other hand, if at time $t_{n-1}$ the value of $du_n$ changes from +1 to −1, the curve 30 changes direction, as indicated by the dotted curve 30', and the appropriate increment in $dRW$ is the area AB'C'D to the left of the point $u_{n-1}$, $v_{n-1}$. It is here that the problem arises.

It will be noted that the designations $\underline{du_n}$, $\underline{dv_n}$, $\underline{dw_n}$, in FIG. 1*a*, are all underscored. This is to denote the fact that in the particular case illustrated, the instantaneous values of these increments are extrapolated; that is they are of necessity lagging one word time behind the corresponding observed values. The reason for this lag is that in any iterative computation it is necessary to either stagger the computing cycles of successive integrating units so that the correct increments are supplied to each unit as and when required, or it is necessary to provide estimated increment inputs initially and thereafter to allow the computation to proceed automatically with a corresponding lag in the appearance of the correct values. The latter operation, known as concurrent integration, is preferred because of the time saving it provides in eliminating the staggering of computing cycles, and is absolutely necessary where the integration variables are so interrelated by feedback and/or cross feed between integrating units, that even with staggering of computation cycles the integration could not begin without at least one such presetting of increment inputs.

This may be more explicitly appreciated by considering the incremental variations of $du_n$, $dv_n$ and $dw_n$ in FIG. 1*a*. These variations assume values +1 or −1, which values must persist concurrently for the entire $n^{th}$ computing interval. It is clear from the circuitry shown that the value $dw_n$ is related to computed values $du_n$ and $dv_n$ which are not yet available. Now, suppose that in a particular computation, through a feedback connection, the value $du_n$ is similarly dependent upon the value $dw_n$. Then, at the very beginning of the computation, in the first computing interval, the values $dw_1$ and $du_1$ would be concurrently dependent upon non-existent values. This situation may be readily resolved by initially presetting values $dw_0$ and $du_0$ prior to the beginning of the first computing interval and extrapolating $dw_1$ and $du_1$ by assuming that no change will occur in the respective values $dw_0$ and $du_0$. Accordingly, once it is appreciated that in at least one integrating unit the variable increment inputs must be initially preset "one step backwards in time," at the commencement of the computation, it follows that the observed values of these increments will lag on step behind the values ascribed to them in time, in such integrating units. Under such circumstances the time of occurrence of each sign reversal in the value of an increment in the independent variable, such as the variable *du* in FIG. 2, will lag the correct time of occurrence by one computing word time, and the predicted value $\underline{du}_n$ which is assumed to be the same as $du_{n-1}$, will not reverse in sign while the increment $\underline{du}_{n+1}$, which is assigned the value $du_n$, may subsequently undergo such a reversal. Hence the value of *du* can undergo a reversal one word time unit after it has been used as an extrapolated value, so that the extrapolated area increment accrued in the previous word time interval is thus in error.

Figure 2:
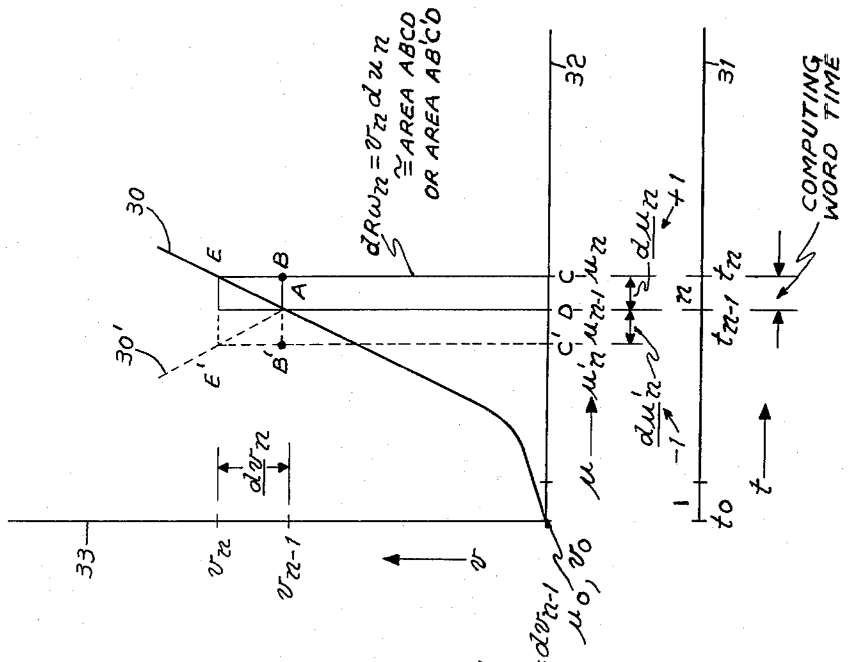

For example, referring to FIG. 2, if after time $t_{n-1}$ there is a reversal in the value of *du*, from +1 to −1 units, then at time $t_{n-1}$, the underscored value $\underline{du}_n$—which is the extrapolated value of $du_n$, extrapolated as $du_{n-1}$—will remain incorrectly equal to +1 unit, and the area ABCD will be added to the previously accumulated quantity R*w*, although the correct operation would be to subtract area AB′C′D from the previously accrued value. As a result, an error of 2 rectangular area increments is introduced into the accrued integral *w*. To remedy this, when the sign reversal in the incremental variable *du* is detected, it is necessary in the next computing interval to subtract 3 rectangular area increments on the order of magnitude of the rectangle AB′C′D to maintain the accrued integral *w* at the correct value (two rectangular area increments to correct the extrapolation error and one to continue the integration process).

This situation is somewhat analogous to that involved in integrating the areas under periodic curves having the same period and shape, but differing slightly in phase. In such situations, it is readily appreciated that the definite integrals will also differ slighlty at any given point, due to the phase difference. It should also be appreciated that if the definite integrals thus computed are utilized, through indirect feedback, to determine the incremental changes in the integration input variables describing the periodic functions, the differences between the integral values due to the phase difference between the periodic integrating variables may rapidly "grow" to intolerable proportions.

To overcome this "growth error" applicants have devised circuits for introducing correction factors upon each reversal in the sign of the time displaced increments of the integration variables, this being analogous to introducing a phase difference correction during each cycle of variation of the foregoing periodic functions.

Accordingly, as indicated in FIG. 3, blocks 20 and 23 are provided in the circuit previously considered in FIG. 1*a*, to introduce the necessary corrections. Circuit 20 receives the increments $du_{n-1}$ which serve as the extrapolated increments $\underline{du}_n$, and detects reversals in sign between successive values thereof. Circuit 23 normally receives the output A of gating circuit 10 and passes it unaltered to adder 18. However, in conjunction with a sign reversal in *du*, as sensed thru connection 22, the circuit 23 multiplies the current area increment A by 3, thereby providing the proper correction.

We prefer, in the practice of this invention, to arrange our digital integration units as shown in FIG. 4 so as to appreciate the additional accuracy benefits associated with the process known as trapezoidal integration. In this process, referring to FIG. 2, the increments *d*R*w* added to the quantity R*w* correspond to areas of trapezoids such as the trapezoid AECD obtained by adding the triangular area AEB to the rectangular area ABCD. By operating on signals representing such trapezoidal area increments, it is possible to more closely approximate the true area beneath the curve 30 at each step of the integration. It will be recalled that the rectangular area increments are represented by the products $v_{n-1}\underline{du}_n$. It may therefore be appreciated that the trapezoidal area increment is properly represented by $$A_n = v_{n-1}\underline{du}_n + \tfrac{1}{2}\,\underline{dv}_n\underline{du}_n.$$

Hence, referring to FIG. 4, in the preferred circuit arrangement, a modified gating circuit **10*a* multiplies the quantity $v_{n-1}$ by +1 or −1 in accordance with the current value of $\underline{du}_n$, and also selectively adds +½ or −½ to the aforementioned product to thereby provide the modified output $A_1$. It is this modified output that is operated upon by the circuit 23 to produce modified output $B_1$ which corresponds to a value either equal to, or three times the value of $A_1$, depending upon the output condition of circuit 20 as sensed through connection 22**.

Thus, the essential nature of the apparatus embodying applicants' invention has been described. In order to more specifically disclose the details of the blocks shown in the preceding figures, it is necessary to indicate the nature of the numerical quantities operated upon. In the following circuit description, it is presumed that the circuits operate in serial fashion upon information signals representing binary numbers. That is, binary value signal trains circulating serially through individual signal channels represent numbers referenced to the base 2.

Referring to FIG. 5, the serial adder 8 considered in the preceding FIGURES 1*a*, 3 and 4, includes a flip-flop $F_1$, having two output terminals 40 and 41. Terminal 40 is connected to And-circuits 42 and 45 while terminal 41 is connected to And-circuits 43 and 44. The condition of the flip-flop when And-circuits 42 and 45 are enabled, is designated $0F_1$, while the opposite condition, that in which And-circuits 43 and 44 are enabled, is designated $1F_1$. It should be readily obvious to those skilled in the art that when And-circuits 42 and 45 are enabled, And-circuits 43 and 44 are disabled and conversely, when And-circuits 43 and 44 are enabled, And-circuits 42 and 45 are disabled. The outputs of And-circuits 42 and 44 are connected to an Or-circuit 46, while the outputs of And-circuits 43 and 45 are connected to an Or-circuit 47. The outputs of Or-circuits 46 and 47 are respectively translated through isolating "driver" amplifiers 48 and 49 to respective output conductors **9*b* and 9*a* corresponding to the output conductor 9 indicated in the previous figures. The inputs to the aforementioned And-circuits 42, 43, 44 and 45, comprise the circulating output of the register 5 and the numerical complement thereof. The register output $v_{n-2}$ is applied to conductor 6*a* which is coupled to And-circuits 44 and 45** and the complement register output designated $\bar{v}_{n-2}$, is applied to conductor *6b* which is coupled to the inputs of And-circuits 42 and 43. It should be appreciated that the conductors *6a* and *6b*, in aggregate, represent the conductor 6 of the preceding figures.

With flip-flop $F_1$ in the condition $1F_1$, the signals on conductors *6a* and *6b* are transferred to the conductors *9b* and *9a* respectively, thereby, in effect, complementing the digits signals so transferred. It will be recalled that the function of adder 8 is to add +1 or −1 to the least significant digit of the number $v_{n-2}$ depending upon the value of the increment $\underline{dv}_{n-1}$. It will further be appreciated by those skilled in the art that the addition of +1 or −1 to the least significant digit of a binary number is accomplished by complementing successive digits of the number in sequence beginning with the least significant digit, and ending with, but including, the first 0 or 1 digit, depending respectively upon whether +1 or −1 is being added to the number. Thus, at the beginning of the $(n-1)^{th}$ word time interval, $F_1$ is set to the $1F_1$ condition by a first clock pulse $(cp_1)_{n-1}$, selected from a train of clock pulses $(cp_j)_{n-1}$, some of which are synchronous with the digit signals of the information being operated upon. The numbers being handled are 30 digit numbers which are forwarded in conjunction with clock pulses $(cp_2)_{n-1}$ through $(cp_{32})_{n-1}$. In each word time interval, 36 clock pulses are supplied, designated $cp_1$ to $cp_{36}$ along with a proper subscript *n* to identify the computing interval. These pulses are applied to And-circuits 50 and 51, to synchronously enable these circuits. At the same time, the digits of $v_{n-2}$ are synchronously supplied to And-circuit 50 while the complement digits are supplied to And-circuit 51. Finally, the condition at the output of And-circuit 51 is controlled by the condition of the signal $dv_{n-1}$ supplied through conductor *3a* and that of And-circuit 50 is controlled by the condition of the complement signal $\overline{dv}_{n-1}$ supplied to And-circuit 50 through conductor *3b*. Clock pulses which are transferred through the And-circuits 50 and 51, along with the 32nd clock pulse $cp_{32}$ of each word time interval are translated through Or-circuit 52 to condition $F_1$ to the $0F_1$ state, and thereby to cause the flip-flop to cease complementing the signals transferred between the sets of conductors *6a*, *6b* and *9a*, *9b*. By virtue of the inputs to And-circuits 50 and 51, it should be appreciated that if the value of $dv_{n-1}$ is +1, the output of the And-circuit will trigger the flip-flop $F_1$ when the first 0 digit of $v_{n-2}$ appears on conductor *6a* in synchronism with its corresponding clock pulse. The structure of flip-flop $F_1$ is such that the state of the flip-flop changes in conjunction with the lagging or trailing edge of the applied clock pulse triggering signal, and it is therefore to be understood that the first 0 digit of $v_{n-2}$ will also be complemented in its passage between conductors *6a*, *6b* and conductors *9a*, *9b* because of the delay in the switching of the flip-flop. On the other hand, if $dv_{n-1}$ has the value −1, then the signal on conductor *3b* will enable And-circuit 50 so that the first "1" digit of $v_{n-2}$ will trigger flip-flop $F_1$, in delayed fashion as previously explained, into the $0F_1$ condition. Thus, with the digits of $v_{n-2}$ supplied in sequence beginning with the least significant digit and ending with the most significant digit, all of the digits in sequence, up to and including the first "0" or "1" digit, are complemented, depending respectively upon where +1 or −1, is being added to the least significant digit of *v*, to yield the number $v_{n-1}$.

The foregoing timing sequence is more clearly disclosed in connection with FIGURES 6 and 6*a* wherein it is seen that the signals *dv* and the complement signals $\overline{dv}$ persist for complete word time intervals as shown at 60*a*, 60*b*, and 60*c*. During each of these word time intervals, the condition of flip-flop $F_1$ is characterized by the timing diagrams 62 and 63. The gate circuit enabling output level on the "one" side of the flip-flop is shown at 64 and the enabling output from the "0" side is shown at 65. Similarly, the gate disabling output level at the "one" side of $F_1$ is shown at 66 while that of the "0" side is shown at 67. In each of the word time intervals 60, 61, and 62, a series of 36 clock pulses is received. One such series delivered in synchronism with the digits of $v_{n-2}$, is shown by way of example at 68 during the word time interval 60*a*. Following the first clock pulse $cp_1$, flop-flop $F_1$ is set to the $1F_1$ gate enabling condition. Thereafter, following a selected one of the succeeding clock pulses the flip-flop is reset to the $0F_1$ (non-complementing) gate enabling condition. The selection of the succeeding clock pulse in each interval is characterized in FIGURE 6*a*, where it is seen that prior to the beginning of word time interval 60, the value of *v* is $v_{n-2}$=11101 . . . 001. In the interval 60, $dv_{n-1}$ has the value +1 as indicated in FIGURE 6, and therefore +1 is added to $v_{n-2}$ by complementing all of the digits in sequence, beginning with the least significant digit, up to and including the first "0" digit which in this instance is the fourth digit. It is therefore seen that the $1F_1$ enabling condition of flip-flop $F_1$ will persist for four clock pulse periods following the first clock pulse of the interval 60, and the value of $v_{n-1}$ is, therefore

00011 . . . 001

Similiarly, in word time interval 60*b*, $dv_n$ is again +1 but this time the least significant digit of $v_{n-1}$ is 0, and therefore the gate enabling condition $1F_1$ persists for only on clock pulse time so that a value $v_{n+1}$=10011 . . . 001 is obtained for $v_n$. In the next word time interval 60*c*, $dv_{n+1}$ is −1, and accordingly one is subtracted from $v_n$ by complementing all of the digits beginning with the least significant digit up to and including the first "1" digit. Since the first digit of $v_n$ is 1, the $1F_1$ gate enabling condition will persist, as shown, for only one clock pulse time so that $v_{n+1}$=00011 . . . 001=$v_{n-1}$ as required.

Referring to FIGURE 7, the outputs on conductors *9a* and *9b* of FIGURE 5 are supplied at inputs to gating circuit 10 previously disclosed as a block in FIGURES 1*a* and 3. Gating circuit 10 includes two And-circuits 70 and 71 which receive the signals on conductor *9a*, and And-circuits 72 and 73 which receive the signals on conductor *9b*. And-circuits 70–73 are all enabled by clock pulses $cp_2$–$cp_{32}$ which are delivered in synchronism with the digits of $v_{n-1}$. And-circuits 70 and 72 are further controlled by the signals on conductor *2a* representing the increment input $\underline{du}_n$, while And-circuits 71 and 73 are further controlled by the signals on conductor *2b*, representing the complementary extrapolated increment input $\overline{du}_n$. The outputs of And-circuits 70 and 73 are supplied to an Or-circuit 74, while the outputs of And-circuits 71 and 72 are coupled to an Or-circuit 75. Or-circuit 75 additionally receives the 33rd clock pulse $cp_{33}$ which performs a resetting function for the circuit. The outputs of Or-circuits 74 and 75 are respectively applied to the 1 and 0 inputs of a flip-flop $F_2$ having output conductors 11*a* and 11*b* on which the respective signals A and $\bar{A}$ appear. By virtue of the inputs to the four And-circuits 70–73, it may be seen that flip-flop $F_2$ is established in the $1F_2$ condition, that in which the output A is "high," if the current digit of $v_{n-1}$ is 1, and the value of $\underline{du}_n$ is +1. On the other hand flip-flop $F_2$ is conditioned to the $0F_2$ state if the current digit of $v_{n-1}$ is 0 and the value of $\underline{du}_n$ is 1. So that the value represented by the output condition of flip-flop $F_2$ follows the value of the digits of $v_{n-1}$ when $\underline{du}_n$ is +1. However, if $\underline{du}_n$ is −1, then And-circuits 71 and 73 are enabled, and the input lines *9a* and *9b* are cross-coupled to the respective Or-circuits 74 and 75 so that the resultant state of the flip-flop will be opposite to, and therefore represent the complement of, the digits of $v_n$.

It will be recalled, as in the discussion of flip-flop $F_1$, that all flip-flops disclosed herein are triggered or conditioned in conjunction with the trailing edge of the applied signal, which in this instance is the trailing edge of the enabling clock pulses. Under these circumstances, therefore, it will be appreciated that in the circulation of the numerical quantity $v_{n-1}$ through gating circuit 10, there will be a 1 digit time delay between the inputs *9a* and *9b* and the outputs transferred to conductors *11a* and *11b*.

The logical expression, in Boolean notation for the output of flip-flop $F_2$ is, $A=(v_n)_j\cdot\underline{du}_n$, and the complementary output $\overline{A}$ is the inverse or opposite of the output A. It is thus apparent that the digits of $v$, $(v_{n-1})_j$ are all multiplied by + or −1 in accordance with the value of $\underline{du}_n$ and accordingly, it is clear that the required multiplying function of gate circuit 10 is accomplished.

Gating circuit *10a* of FIGURE 4 represents a modification of gating circuit 10 which is required to permit simultaneous multiplication of the digits $(v_{n-1})_j$ by $du_n$, and addition of the trapezoidal correction $+\frac{1}{2}\underline{dv_n du_n}$. Accordingly, gating circuit *10a* of FIGURE 4 includes a gating circuit 10 previously described in connection with FIGURE 7 as shown in FIGURE 8. Further, as indicated in FIGURE 8, gating circuit *10a* includes a flip-flop $F_3$. The $1F_3$ output controls the enabling of And-circuits 81 and 82, while the $0F_3$ output determines the enabling of And-circuits 80 and 83. The outputs of And-circuits 80 and 82 are combined through Or-circuit 84, while the outputs of And-circuits 81 and 83 are mixed in an Or-circuit 85. The outputs of Or-circuits 84 and 85 are respectively applied to output conductors *24a* and *24b*. These outputs are identified respectively as $\overline{A}_1$ and $A_1$. It is thus clear, in view of the inputs to And-circuits 80–83, that when $F_3$ is in the 0 condition, the 0 digits of A pass through And-circuit 80 and Or-circuit 84 to output conductor *24a*, while the 1 digits of A pass through And-circuit 83 and Or-circuit 85 to the output conductor *24b*. The foregoing, in effect, amounts to the unaltered passage of A between the set of conductors *11a* and *11b* and the corresponding set of conductors *24a* and *24b*. On the other hand, in the $1F_3$ condition, the 0 digits of A pass through And-circuit 81 and Or-circuit 85 to conductor *24b* while the 1 digits of A pass through And-circuit 82 and Or-circuit 84 to conductor *24a*. This, in effect constitutes a complementing of the digits of A. The number of digits so complemented, is determined by the length of time during which the flip-flop $F_3$ is conditioned to the $1F_3$ condition. It will be noted that the input to the "one" side of $F_3$ is the first clock pulse $cp_1$, so that the flip-flop is initially established, as shown, at the beginning of each word time interval in the condition where the digits of A will be complemented. The conditioning of the 0 input to flip-flop $F_3$ is determined by the output of Or-circuit 86. It should be recalled that the desired output $A_1$ on conductor *24a* is the quantity $A+\frac{1}{2}\underline{dv_n du_n}$. It may thus be appreciated that $F_3$ is to be set to the $0F_3$ condition (complementing is to cease) when the first 0 or 1 digit of A has passed through the And-circuits 80–83, depending respectively, upon whether the quantity $\frac{1}{2}\underline{dv_n du_n}$ is +1 or −1, respectively. To accomplish this, a logic circuit including four And-circuits 87, 88, 89 and 90, is provided, for conditioning $F_3$ to the $0F_3$ condition through Or-circuit 86, the clock pulse $cp_{33}$ also being applied to Or-circuit 86 as a reset pulse. Clock pulses $cp_2$ to $cp_{32}$ are applied simultaneously to all four And-circuits, and a selected one of these clock pulses is passed through the logic circuit, as determined by the digits of A and $\overline{A}$, and the signal values of $\underline{dv}_n$ and $\underline{du}_n$. If $dv_n$ and $du_n$ are both +1, a clock pulse is passed through And-circuit 87 in conjunction with the first 0 digit of A, resetting flip-flop $F_3$ to the $0F_3$ condition, while if $dv_n$ and $du_n$ are both −1, a clock pulse is passed through And-circuit 88 in conjunction with the first 0 digit of A to the 0 input of $F_3$. Conversely, if $dv_n$ is −1 and $du_n$ is +1, a clock pulse is passed through And-circuit 89 in conjunction with the first 1 digit of A, while if $du_n$ is −1 and $dv_n$ is +1, a clock pulse is passed through And-circuit 90 in conjunction with the first 1 digit of A. This, in effect, results in the addition of +1 or −1 to the least significant digit position of A, as in the addition process discussed in connection with FIGURE 5. However, it will be recalled that in the discussion of FIGURE 7, it was indicated that the digits of A are all delayed by one digit time due to the interposition of flip-flop $F_2$ into the path of propagation of the digits signals. Thus, in effect, the significance of the quantity added to A is + or −½ as required. This corresponds to the operation of adding 1 unit to the digit to the left of the binary point, in a binary number having digits extending to the right of the binary point in ascending order of significance.

The sign detection circuit 20 and selective multiplication circuit 23 of FIGURES 3 and 4 are shown in combination in FIGURE 9. Since the same circuits may be used for the output of either FIGURE 3 or FIGURE 4, the components remain the same, but the signal designations will depend upon the figure to which the circuit is applicable, as will become apparent hereinafter. The structure of circuit 20 is revealed within the dotted enclosure 20, while the remainder of the circuitry comprises the selective multiplication (×1 or ×3) circuit. Circuit 20 receives the increment input $\underline{du}_n$ and its complement on the respective conductors *2a* and *2b*. These conductors are fed as inputs to And-circuits 94 and 95, respectively, having outputs which are coupled respectively to the 1 and 0 inputs of a flip-flop $F_6$. And-circuits 94 and 95 are simultaneously enabled once in each word time interval by the clock pulse $cp_{33}$ which, in effect, defines the time position of the highest order digit transferred during the word time interval. The outputs of the flip-flop $F_6$ are applied to And-circuits 96 and 97. And-circuit 96 is enabled by the $1F_6$ output, while And-circuit 97 is enabled by the $0F_6$ output. The signal on conductor *2a* is applied to And-circuit 97, while that on conductor *2b* is applied to And-circuit 96. It should be clear from the timing signals at the inputs to flip-flop $F_6$ that the purpose of $F_6$ is to store, or memorize, the value of $\underline{du}_n$ in each preceding word time interval, and the functions of And-circuits 96 and 97 are to compare the stored value with the current value of $\underline{du}_n$ to determine when a sign reversal, that is, a difference in values, has occurred. For example, if the previous value of $du$ is $\underline{du}_{n-1}=+1$, and the current value of $du$ is $\underline{du}_n=-1$, then And-circuit 96 will be conditioned, in the 34th clock pulse interval, to present the equivalent of a "high" or 1 output. Conversely, if $du_{n-1}$ is −1 and $du_n$ is +1, And-circuit 97 will be conditioned to signal a 1 output, a 1 output from either And-circuit 96 or 97 serving to indicate the occurrence of a reversal in sign. The outputs of And-circuits 96 and 97 are coupled, through Or-circuit 98, to an isolating amplifier 99. The output of isolating amplifier 99 is a signal C, which is applied to And-circuits 100 and 104 in the selective multiplication circuit 23. It is thus clear that the output of circuit 20 does not vary until there has been a reversal in the sign between successive word time intervals. If C is a "low" or gate disabling signal, then clearly And-circuits 100 and 104 are disabled, and conversely if signal C is a "high" or enabling signal, the And-circuits 100 and 104 are enabled.

In addition to And-circuits 100 and 104, the multiplication circuit 23 includes two flip-flops $F_4$ and $F_5$ which operate, in conjunction with a plurality of logic circuits, to produce the required outputs B or $B_1$, as indicated at conductor *12a*, depending on whether the related block is FIGURE 3 or FIGURE 4 (i.e., depending on whether A or $A_1$ is used as an input). When there has been no detected sign reversal in any preceding word time interval (i.e., when C is "low"), then flip-flops $F_4$ and $F_5$ are respectively set to $0F_4$ and $0F_5$ conditions, by clock pulses transferred through And-circuits 101 and 103 respectively, in association with the 1 state assumed by input $\overline{A}$ after $(cp_{33})_{n-1}$ (see input to $F_2$ in FIG. 7). On the other hand, when the signal C is "high" (that is, when the successive values of $du$ are different), then the condition of flip-flop $F_4$ follows the conditions at the output of And-circuits 100 and 101, so that the output of flip-flop $F_4$ is essentially the quantity A one digit time delayed. It is to be noted that the quantity A may be interchanged with the quantity $A_1$ in this figure, depending upon whether the related block figure is FIGURE 3 or FIGURE 4, respectively. The output of $F_4$ represents the quantity 2A. The output quantity 2A and its complement are applied respectively to And-circuits 102 and 103. Also, the quantity A and its complement are applied to And-circuits 102 and 103, respectively, and both And-circuits are enabled by the same clock pulses.

The outputs of And-circuits 102 and 103 are coupled respectively to the 1 and 0 inputs of a carry flip-flop $F_5$, the output of circuit 102 being coupled through Or-circuit 105. The output of carry flip-flop $F_5$ is applied to a logic circuit comprising four And-circuits 107–110 and an Or-circuit 111. The outputs of this logic circuit is transferred through an isolating amplifier 112 to the output conductor 12*a* as the signal B which is to be added to the remainder signal $R_w$ in the register 15 of FIGURES 1*a*, 3 and 4. The signal B is also complemented by means of inverting circuit 113, and a complement signal $\overline{B}$ appears on conductor 12*b* connected thereto.

Each of the And-circuits 107 to 110 receives three inputs. Two of these inputs represent respectively the quantities A and 2A and complements thereof. The third input represents the condition of the carry signal, or the output of flip-flop $F_5$.

Examining the input to the And-circuits, it is readily appreciated that with a carry signal of 0 ($0F_5$), only And-circuits 109 and 110 can pass signals, and a signal will pass only if the current digit of the quantities A and 2A are different, as indicated by the fact that the inputs to And-circuit 109 are the complement of the current digit of A and the uncomplemented current digit of 2A, while the inputs to And-circuit 110 are the complement of the current digit of 2A and the uncomplemented digit of A, as indicated.

Similarly when the output of the carry flip-flop $F_5$ is $1F_5$, one of the And-circuits 107 or 108, is enabled to produce an output when the current digits of A and 2A are identical. Specifically, when the current digits of A and 2A are both 1, there is an output from And-circuit 107, and when these digits are both 0, there is an output from And-circuit 108. The outputs of all of the And-circuits 107–110 are combined in Or-circuit 111 to produce the signal B.

The circuit of FIG. 9 operates as follows: if flip-flop $F_5$ is in the one state a one output is transferred through Or-circuit 111 if and only if A and 2A are both one or both zero, while if the carry flip-flop $F_5$ is in the zero state, a one otuput is forwarded through Or-circuit 111 if and only if A and 2A are of opposite value. This clearly then is the ordinary sum output expected from the addition of two binary numbers. Further, once set to the one state, the flip-flop $F_5$ remains in that condition until both A and 2A are zero (see And-circuit 103). Again this latter condition is clearly that associated with the carry signal produced during the ordinary addition of binary numbers.

It is therefore clear to those skilled in the art that the operation, thus described, for the circuit 23 is that of an ordinary gated full adder, wherein one of the input quantities (in this instant the quantity 2A), is selectively applied, while the other input quantity (in this instance the quantity A), is always applied, so that the resultant output is either A, or 3A, depending upon whether a change in sign of $\underline{du}$ is detected between the current word time interval and the preceding word time interval.

A slight modification over conventional binary full adders, in the circuit 23, involves the provision of an And-circuit 104 which is also coupled to the Or-circuit 105 and is used to set the carry flip-flop $F_5$ to the $1F_5$ condition upon initiation of an addition cycle, when the output signal from circuit 20, the signal C, is in the "high" condition, and the signal $\underline{du}_n$, represents a −1 value. Thus, upon a change in a given sense in the sign of $du$, a correction factor of 2 units (1 unit in the $cp_4$ carry position) is added to the quantity being processed through the circuit of FIG. 9. This correction factor together with a correction factor of 1 unit applied at time $cp_2$ to a carry flip-flop $F_7$ in the circuit of FIG. 10 constitutes a correction factor of 3 units which is required to compensate for the errors associated with addition of a representation A in ones complement form to the delayed representation 2A, the resultant quantity differing by 3 units from the correct twos complement representation.

Referring to FIGURE 10, adder 18 and gate circuit 19, disclosed as blocks in the previous figures, include a carry flip-flop $F_7$. The output of $F_7$, at the time corresponding to the occurrence of clock pulse 34 is translated directly through And-circuits 124 and 125 to corresponding inputs of a flip-flop $F_8$ having output conductors 4*a* and 4*b* which provide signals indicative of the value of $dw_n$. When the signal on conductor 4*b* is high, $dw_n$ is equal to +1, and conversely when the signal on conductor 4*a* is high, the value of $dw_n$ is −1. Flip-flop $F_8$ and its input And-circuits 124 and 125 comprise the gating circuit 19 previously considered. The inputs to flip-flop $F_7$ are determined by the output B of the preceding circuit of FIG. 9, or equivalently, the output A of gating circuit 10 in FIG. 3—depending upon which figure is considered logically combined with the digit signals of $R_w$, in a logic circuit including And-circuits 119, 120 and 121, and Or-circuits 122 and 123. The outputs of And-circuits 119 and 121 are supplied through Or-circuit 123 to the one input of $F_7$ and the output of And-circuit 120 is supplied along with the 34th clock pulse $cp_{34}$—which serves as a reset signal—through Or-circuit 122 to the 0 input of $F_7$. The signals at the inputs of And-circuit 120 are the complement signal $\overline{B}$ and the complement signal $\overline{Rw}$, while the signal input at And-circuit 121 are the uncomplemented signals B and $Rw$. In addition, And-circuits 120 and 121 are enabled by the word time digit clock pulses $cp_j$. And-circuit 120 receives all of the clock pulses while And-circuit 121 receives only those occurring during the digit intervals corresponding to $cp_3$ through $cp_{33}$. And-circuit 119 receives the signals $\overline{du}_n$ in conjunction with the second clock pulse $cp_2$. In operation, once the carry flip-flop $F_7$ is set to the $1F_7$ condition through the Or-circuit 123, it is not reset, until either both the digits of $Rw$ and B are 0, or until the 34th clock pulse occurs. When flip-flop $F_7$ is in the $1F_7$ condition, indicative of a carry condition, And-circuits 127 and 129 are enabled. And-circuit 127 receives the signal B and the signal $Rw_n$ while And-circuit 129 receives the respective complements of these signals. When flip-flop $F_7$ is in the $0F_7$ condition, And-circuits 126 and 128 are enabled. And-circuit 126 receives the complement signal $\overline{B}$ and the uncomplemented signal $Rw_n$ while And-circuit 128 receives the complement signal $Rw_n$ and the uncomplemented signal B. The outputs of And-circuits 126–129 are combined through Or-circuit 130 and transferred to output conductor 17 which returns the signals to the $Rw$ register 15, it is readily appreciated that when carry flip-flop $F_7$ is signalling a carry condition by means of output $1F_7$, And-circuits 127 and 129 are conditioned to pass signals indicative of sum digit output values 1, when and only when both B and $Rw$ have the same digit values (either 1 or 0). Conversely when carry flip-flop is in the $0F_7$ condition, And-circuits 126 and 128 are conditioned to pass sum signal values 1, when and only when B and $Rw$ are of opposite values (1 and 0 respectively).

Insofar as the conditioning of the carry flip-flop $F_7$ is concerned, it is seen that when $Rw$ and B both represents 0 values, the flip-flop $F_7$ is conditioned to the $0F_7$ condition through And-circuit 120 and Or-circuit 122. On the other hand, when the values of B and R$w$ are both 1, or, at the beginning of the word time computing interval, when $cp_2$ occurs in conjunction with a negative increment value $\overline{du}_n$, $F_7$ is set to the $1F_7$ condition. Once in the $1F_7$ condition, the flip-flop remains in that condition until the required inputs are supplied to And-circuit 120 to reverse the condition.

Those skilled in the art will readily recognize that this arrangement, with the exception of the function of And-circuit 119, constitutes the ordinary circuit arrangement for determining the value of the carry signal in an ordinary full binary addition. Thus, it is seen that, once a carry is generated, the carry signal remains 1 until both of the digits being added are simultaneously 0. It is also appreciated that the function of circuit 119 is to add a value of +1 to the least significant digit of the accumulated values. Thus, in over-all review it is seen that the output of the gate circuit 119 will be +1 or −1, depending respectively, upon respectively whether there is not or is an overflow carry from the 33rd clock pulse in each word time interval (the time of transfer of the most significant digits of R$w$ and B). Concurrently, the ordinary sum of R$w$ and B is recirculated back to the R$w$ register. It should be appreciated that the quantity B in FIGURE 10 and also the quantity A in FIGURE 9 are used as examples in the respective figures. In FIGURE 10, for example, referring back to FIGURES 1*a*, 3 and 4, it may be appreciated that the input to the adder 18 may be either the signal B, the signal A, or the signal $B_1$. Similarly, in FIGURE 9, referring back to FIGURES 3 and 4, it may be appreciated that the input A may be interchangeably replaced by the input $A_1$ where the circuitry of FIGURE 4 is used, instead of that of FIGURE 3.

Thus far, in the description of the correction procedure, the possibility of a change in the independent variable $dv$, and also as noted in FIG. 4 the fact that the trapezoidal correction one-half $dv_n$–$du_n$ is multiplied by three in the circuit 23 have been ignored. In general, the procedure thus far outlined provides a sufficiently accurate correction factor. However, if more accuracy is desired or necessary in a given instance the corrective procedure can be more accurately and completely manifested in accordance with the analysis given below and the corresponding circuit block diagram shown in FIG. 11.

*Complete corrective procedure analysis*

Referring to FIGURE 2, we may define for the $n+1$st computing word time:

(1) $\underline{du}_{n+1}$=extrapolated (unavailable) value of $du$ which is set equal to $du_n$ (2) $\underline{dv}_{n+1}$=extrapolated value of $dv$ which is set equal to $dv_n$ (3) $v_n=v_{n-1}+dv_n$ (4) $(d\underline{Rw})_{n+1}$=extrapolated increment in quantity R$w$ which determines incremental changes $dw_n$ in the variable $w$;

Thus, (5) $(d\underline{Rw})_{n+1}=(dRw)_{n+1}+e_{n+1}$; where $e_{n+1}$ is the correction factor introduced to compensate for an error accruing in the $n$th interval due to use of an incorrect extrapolated increment (the sign change being detected in the $n+1$st interval)

Accordingly, if there is no sign change, then $e_{n+1}=0$ and $$(6)\quad (dRw)_{n+1}=v_n\underline{du}_{n+1}+\tfrac{1}{2}\underline{dv}_{n+1}\underline{du}_{n+1}=v_ndu_n+\tfrac{1}{2}dv_ndu_n$$

For a change in sign in $du$ only (the situation previously considered), $$e_{n+1}=-2(v_{n-1}\underline{du}_n+\tfrac{1}{2}\underline{dv}_n\underline{du}_n)$$
$$=+2[v_{n-1}du_n+\tfrac{1}{2}dv_ndu_n]$$
$$=2(v_n-dv_n)du_n+2(\tfrac{1}{2})dv_ndu_n$$
(note Equation 3 above)
$$=2v_ndu_n-dv_ndu_n$$

Hence, from Equations 5 and 6 above $$(7)\quad (dRw)_{n+1}=3v_ndu_n-\tfrac{1}{2}dv_ndu_n$$

For a change in sign of $dv$ only, $$e_{n+1}=-2[\tfrac{1}{2}\underline{dv}_ndu_n]=dv_ndu_n$$

Hence, $$(8)\quad (dRw)_{n+1}=v_ndu_n+\tfrac{3}{2}dv_ndu_n$$

Finally, for a change in sign of both $du$ and $dv$, $$e_{n+1}=-2[v_{n-1}\underline{du}_n]=2v_{n-1}du_n$$
$$=2(v_n-dv_n)du_n=2v_ndu_n-2dv_ndu_n$$

Hence, $$(9)\quad (dRw)_{n+1}=3v_ndu_n-\tfrac{3}{2}dv_ndu_n$$

For convenient reference, Equations 6–9 are rewritten below:

(6) $(dRw)_{n+1}=v_ndu_n+\tfrac{1}{2}dv_ndu_n$ (no change)

(7) $(dRw)_{n+1}=3v_ndu_n-\tfrac{1}{2}dv_ndu_n$ ($du$ only)

(8) $(dRw)_{n+1}=v_ndu_n+\tfrac{3}{2}dv_ndu_n$ ($dv$ only)

(9) $(dRw)_{n+1}=3v_ndu_n-\tfrac{3}{2}dv_ndu_n$ ($du$ and $dv$)

Noting that upon a change in sign $du_n=-du_{n-1}$, the changes in sign, in the second terms of Equations 7 and 9 above, may be avoided by substituting $-du_{n-1}$ for $du_n$ in Equations 7 and 9 so that Equations 6–9 may be rewritten as corresponding Equations 6′–9′ below:

(6′) $(dRw)_{n+1}=v_ndu_n+\tfrac{1}{2}dv_ndu_{n-1}$ (no change)

(7′) $(dRw)_{n+1}=3v_ndu_n+\tfrac{1}{2}dv_ndu_{n-1}$ ($du$ only)

(8′) $(dRw)_{n+1}=v_ndu_n+\tfrac{3}{2}dv_ndu_{n-1}$ ($dv$ only)

(9′) $(dRw)_{n+1}=3v_ndu_n+\tfrac{3}{2}dv_ndu_{n-1}$ ($du$ and $dv$)

Thus, the simplest form of the complete correction procedure is summarized in Equations 6′–9′ above. The block diagram of the corresponding system is shown in FIGURE 11 wherein details of blocks disclosed in connection with FIGS. 4–9 are omitted.

In FIG. 11, signals representing $v_ndu_n$ and the complement thereof, $\overline{v_ndu_n}$ are applied to a circuit 200 which selectively multiplies by 1 or 3 in the manner disclosed in the discussion of FIG. 9. The output of the circuit 200 and the complement representation (E and $\overline{E}$ respectively) are coupled to an adder circuit 202 similar to the adder circuit included in FIGURE 9. Adder circuit 202 comprises a carry circuit including three And-circuits 203–205, two Or-circuits 206–207, and a carry flip-flop 208 which function in identical fashion to the corresponding elements in FIG. 9. The adder further comprises a sum producing circuit including And-circuits 210–213 and an Or-circuit 214, the output of which represents the quantity $Rw_n$ from which the increment $dw$ in the variable $w$ is derived. The output of Or-circuit 214 is synchronously passed through isolating amplifier 215 and And-circuit 216 into the R$w$ register 217. The output of register 217 is forwarded to gating circuit 218 where $\tfrac{1}{2}dv_ndu_{n-1}$ is effectively added to the least significant R$w$ as required by Equations 6′ and 7′ in the manner shown in FIG. 8. Then the output of circuit 218 is applied to an identical circuit 219 where an additional $dv_ndu_{n-1}$ is added to the second least significant digit providing that a change in sign of $dv$ has occurred as required by Equations 8′ and 9′, and as determined by the $dv$ sign change detecting circuit 220 in association with And-circuit 221. The output of circuit 219 is then applied to adder 202 where it is summed with the quantity E to produce the new value of R$w$, and the output of carry flip-flop 208 of the adder is sampled at the highest order digit overflow time $cp_{34}$, by means of And-circuit 222, the sampled output representing the computed quantity $dw_n$ which is stored in a flip-flop (not shown). Thus, the complete algorithm defined by Equations 6′–9′ is implemented.

Circuits suitable for use as And and Or-circuits are shown and discussed on pages 394 to 400 of Millman, J., and Taub, H., "Pulse and Digital Circuits," McGraw-Hill, 1956. Similarly, triggering of a flip-flop with the trailing edge of applied triggering pulses, as required herein, is completely discussed on pages 157 to 158 of the above reference, and suitable triggering circuits responsive to the trailing edge of an applied positive pulse are shown in FIGURES 5–13 on page 161 of said reference. Isolating amplifiers 48 and 49 of FIGURE 5, and 112, of FIGURE 9, are ordinary cathode follower circuits of the type shown and described on pages 15 to 22 of the above reference. Inverting circuit 113 in FIGURE 9 is preferably an ordinary phase inverter, as shown in FIGURES 1–14 on page 18 of the above reference. Finally, registers 5 and 15 in FIGS. 1*a*, 3 and 4 are preferably shift registers of the type considered on pages 412 to 413 of the Millman and Taub reference. Although specific apparatus is thus described in the foregoing, it should be readily appreciated by those skilled in the computer arts that each basic logic circuit and component may be manifested in a plurality of different arrangements without departing from the true spirit and scope of this invention. Similarly, it should be understood that many variations, in the overall logic of the foregoing computing process and selective correction factor application of this invention, may be made without deviating from the bounds of the invention. Consequently, we claim:

1. A cumulative digital computer comprising a source of first signals which represent a time displaced sequence of numerical values of a corresponding first variable of determinable sign, computing means coupled to said source for performing cumulative algebraic operations on said signals to produce second signals which represent values of a second variable cumulatively dependent upon said first variable, where said first variable serves as an extrapolated factor, means coupled to said source for detecting reversals in said sign of said first variable, means coupled to said sign reversal detecting means for producing correction factor signals upon each said sign reversal, and means for applying said correction factor signals to said computing means to prevent the accrual of cumulative sign reversal errors in said values of said second variable.

2. A cumulative digital computer comprising a source of first signals which represent a time displaced sequence of numerical values of a corresponding first variable of determinable sign, computing means coupled to said source for producing second signals which represent values of a second variable cumulatively dependent upon said first variable, where said first variable serves as an extrapolated factor, means coupled to said source for detecting reversals in said sign of said first variable, means coupled to the output of said sign reversal detecting means and to said source for providing, upon each said sign reversal, signals representing a correction factor determined in accordance with said sign of said first variable following each said reversal, and means for applying said correction factor signals to said computing means to prevent the accrual of cumulative sign reversal errors in said values of said second variable.

3. A digital integrator comprising first and second sources of signals representing respective first and second time displaced sequences of successive numerical increments of determinable sign in respective first and second related variables, computing means coupled to the outputs of said first and second sources for producing signals representing numerical values of successive increments in the definite integral of one of said variables taken with respect to the other of said variables, means coupled to said first source for detecting reversals in said sign of said increments in said first variable, and means coupled between the output of said sign reversal detecting means and an input of said computing means for applying correction factor signals to said computing means following each said sign reversal to prevent the accrual of cumulative sign reversal errors in said definite integral.

4. A digital integrator, according to claim 3, wherein said one of said variables is said first variable and said other of said variables is said second variable.

5. A digital integrator, according to claim 3, wherein said one of said variables is said second variable and said other of said variables is said first variable.

6. A digital integrator comprising first and second sources of signals representing respective first and second time displaced sequences of successive numerical increments of determinable sign in respective first and second related variables, computing means coupled to said first and second sources for producing signals representing numerical values of successive increments in the definite integral of one of said variables taken with respect to the other of said variables, means coupled to said first and second sources for detecting reversals in said signs of said increments of said variables, means coupled to said sign reversal detecting means and to said first and second sources for producing signals representing correction factors selected in accordance with the signs of said increments before and after each said reversal, and means for applying said correction factor signals to said computing means to prevent the accrual of cumulative sign reversal errors in said definite integral.

7. A digital integrator comprising a first source of signals representing time displaced numerical increments of determinable sign in a corresponding first variable, a second source of signals representing numerical increments in a corresponding second variable functionally related to said first variable, computing means coupled to said first and second sources for accumulating in discrete steps successive values of said first variable from the algebraic sum of said increments in said first variable, said second computing means also including means for conjointly accumulating in discrete steps the numerical integral of said first variable taken with respect to said related second variable by means of a numerical integration method involving algebraic operations on computational terms in which said first variable increments serve as extrapolated factors, means coupled to said first source for detecting reversals in said sign of said first variable increments, means coupled between the output of said sign reversal detecting means and an input of said second computing means for modifying said numerical integral following each said sign reversal so as to cancel cumulative sign reversal errors.

8. A digital integrator comprising a first source of signals which represent a time delayed sequence of numerical values of a corresponding first variable of determinable sign, a second source of signals which represent time delayed increments of determinable sign in the numerical value of a corresponding second variable functionally related to said first variable, computing means coupled to said first and second sources for computing the numerical integral of said first variable with respect to said second variable, means coupled to said second source for detecting reversals in said sign of said time delayed increments, means coupled to the output of said sign reversal detecting means for deriving signals which represent a correction factor for nullifying sign reversal errors, and means for applying said correction factor signals to an input of said computing means.

9. A digital integrator comprising first and second sources of signals representing respective first and second time displaced sequences of successive numerical increments of determinable sign in respective first and second related variables, adding means coupled to said first source of signals, circulating register means coupled between the output of said adding means, and an input of said adding means, said adding means being arranged to add or subtract a value of one to or from the least significant digit of said register means depending upon the value of said signals from said first source, gating circuit means coupled to said output of said adder means and to said first and second sources of signals for producing signals indicative of the sum of the product of said adder output and said increment signals from said second source and the product of said first and second increment signals applied as an increment to the digit preceding the least significant digit of said first product, sign reversal detection means coupled to said second source of signals for detecting reversals in the sign of said second signals, selective multiplication circuit means coupled to the output of said sign reversal detection means and said gating circuit means for selectively multiplying the output of said gating circuit means by 1 or 3, depending upon whether or not a reversal in the sign of said second variable has occurred, adding circuit means connected to the output of said selective multiplication means for accumulating the outputs thereof, circulating register means coupled to the output of said adding circuit means for circulating and storing the output thereof, said output of said circulating register means being coupled to an input of said adding circuit means to periodically repeat said accumulation, and gating circuit means coupled to the output of said adding circuit means for selectively translating signals representing overflow digits of the output of said adder means.

10. A digital integrator comprising a first source of signals representing time displaced unit increments of determinable sign in a corresponding first variable, a second source of signals representing unit increments of determinable sign in a corresponding second variable functionally related to said first variable, means coupled to said first source of signals for accumulating successive values of said first variable from said increments, means coupled to the output of said accumulating means and to said first and second sources for producing signals representing the product of said successive values of said first variable and said second increments with the least significant digit of said product modified in accordance with the product of said increments of said first and second variables, means coupled to said second source for detecting reversals in the sign of said unit increments, means coupled to said sign reversal detecting means and said accumulating means for multiplying the output of said accumulating means by a correction factor selected in accordance with the output of said detection circuit, second accumulating means coupled to the output of said selective correction factor means, for algebraically accumulating the output thereof, second selection means coupled to the output of said second accumulating means for selectively transferring overflow carry digits from the most significant digit of said accumulated quantity at the output of said accumulating means, whereby said overflow digit represents a corrected value of increments in a third variable representative of the integral of said first variable taken with respect to said second variable, said corrected value being free of cumulative sign reversal errors.

11. An integrator according to claim 10 wherein said sign reversal detecting means comprises means for temporarily storing each successive value of said second variable, means for comparing said stored value with said current values of said second variable, and means for generating an output when said values are different, said selective multiplication circuit further including means for translating the output of said accumulating means and delay means for separately transferring a value of twice said output, and means for selectively adding the output of said delay means to said translated output in response to the output of said sign reversal detection means.

12. In a digital integrating system, a reversal error correcting system comprising means for producing an approximate representation of an incremental variation in the integral of a first variable with respect to an extrapolated incremental variation in a second variable, first means for detecting a reversal in the sign between successive ones of said extrapolated increments, means coupled to said first detecting means for selectively transferring either said representation of said incremental variation or 3 times said representation depending upon the output of said first detecting means, adding means coupled to said last mentioned means, storing means coupled to said adding means, means coupled to said storing means for adding a trapezoidal integration correction factor to a previously stored quantity, second means for detecting a change in sign between successive incremental variations in said first variable, means coupled to said second detecting means and to said trapezoidal correction factor adding means for adding a variable sign reversal correction factor to the output of said trapezoidal correction factor adding means, and means coupling the output of said last mentioned means as an input to said adding means.

References Cited by the Examiner

UNITED STATES PATENTS

| | | | |
|---|---|---|---|
| 2,995,302 | 8/61 | Ingwerson et al. | 235—152 |
| 3,050,251 | 8/62 | Steele | 235—152 X |

ROBERT C. BAILEY, *Primary Examiner.*

MALCOLM A. MORRISON, *Examiner.*